(12) United States Patent
Chang et al.

(10) Patent No.: US 11,379,397 B2
(45) Date of Patent: Jul. 5, 2022

(54) TRANSMISSION DEVICE CAPABLE OF CONTROL FEEDBACK AND CONTROL FEEDBACK METHOD

(71) Applicant: AVER INFORMATION INC., New Taipei (TW)

(72) Inventors: Han-Yen Chang, New Taipei (TW); Ming Kang Chuang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 0 days.

(21) Appl. No.: 17/023,233

(22) Filed: Sep. 16, 2020

(65) Prior Publication Data

US 2021/0081344 A1   Mar. 18, 2021

(30) Foreign Application Priority Data

Sep. 17, 2019   (TW) .................................. 108133463

(51) Int. Cl.
*G06F 13/38* (2006.01)
*G06F 9/4401* (2018.01)
*G06F 13/42* (2006.01)

(52) U.S. Cl.
CPC .......... *G06F 13/385* (2013.01); *G06F 9/4411* (2013.01); *G06F 13/4282* (2013.01); *G06F 2213/0042* (2013.01)

(58) Field of Classification Search
CPC .. G06F 13/385; G06F 9/4411; G06F 13/4282; G06F 2213/0042
See application file for complete search history.

(56) References Cited

U.S. PATENT DOCUMENTS

| 5,930,475 | A  | * | 7/1999 | Yashiro | ................... | H04H 60/13 |
|           |    |   |        |         |                     | 709/217 |
| 6,223,286 | B1 | * | 4/2001 | Hashimoto | ......... | H04L 12/1868 |
|           |    |   |        |         |                     | 380/280 |
| 2004/0125793 | A1 | * | 7/2004 | Yi | ........................... | H04L 67/04 |
|           |    |   |        |         |                     | 370/352 |
| 2004/0130568 | A1 | * | 7/2004 | Nagano | ............ | H04N 21/64792 |
|           |    |   |        |         |                     | 715/733 |
| 2005/0050150 | A1 | * | 3/2005 | Dinkin | .................... | H04L 51/12 |
|           |    |   |        |         |                     | 709/207 |
| 2012/0113993 | A1 | * | 5/2012 | Sridhar | .................... | H04L 69/04 |
|           |    |   |        |         |                     | 370/474 |
| 2013/0179685 | A1 | * | 7/2013 | Weinstein | ............... | G06F 21/85 |
|           |    |   |        |         |                     | 713/168 |

(Continued)

*Primary Examiner* — Henry Tsai
*Assistant Examiner* — Aurangzeb Hassan
(74) *Attorney, Agent, or Firm* — Maschoff Brennan

(57) ABSTRACT

A transmission device capable of control feedback comprises a sender and a receiver. The sender electrically connects to an electronic device through USB type-C for receiving an image signal and sending a control signal. A first processing circuit of the sender converts a network packet into the control signal. A first communication circuit of the sender receives the network packet and sends the image signal. The receiver electrically connects to a display device for sending the image signal and receiving the control signal. A second processing circuit of the receiver encapsulates control signal into the network packet. A second communication circuit of the receiver communicably connects to the first communication circuit to send the network packet and receive the image signal.

7 Claims, 2 Drawing Sheets

(56) References Cited

U.S. PATENT DOCUMENTS

2018/0091758 A1\* 3/2018 Lee ................... G06F 1/1694
2019/0094988 A1\* 3/2019 Ano ................... G06F 3/0304
2019/0265847 A1\* 8/2019 Ano ................... G06F 3/0482
2021/0035429 A1\* 2/2021 Daoura ............. G08B 21/0291

\* cited by examiner

TRANSMISSION DEVICE CAPABLE OF CONTROL FEEDBACK AND CONTROL FEEDBACK METHOD

CROSS-REFERENCE TO RELATED APPLICATIONS

This non-provisional application claims priority under 35 U.S.C. § 119(a) on Patent Application No(s). 108133463 filed in Taiwan on Sep. 17, 2019, the entire contents of which are hereby incorporated by reference.

BACKGROUND

1. Technical Field

The present disclosure relates to wireless projection, and more particularly to an image transmission device capable of control feedback and control feedback method.

2. Related Art

Wireless projection is to transmit the screen and the voice of the electronic device through the wireless network to the receiver to display and play. The wireless projection device implemented by hardware may be divided into two types according to the connection interfaces.

The first type of the wireless projection device adopts Universal Serial Bus (USB) as the connection interface. When the sender of the wireless projection device connects to the computer through the USB interface, the computer recognizes the sender as an USB mass storage device. The user may directly perform an application installed on the sender to start wireless projection without installing any driver or software beforehand. However, the function of wireless projection device cannot be performed if the application provided by the manufacturer does not support the operating system of the user's computer.

The second type of the wireless projection device adopts High Definition Multimedia Interface (HDMI) as the image transmission interface. When the sender of the wireless projection device connects to the computer through the HDMI, the computer recognizes the sender as an external display device. However, the user has to connect a USB dongle additionally to control the sender from the receiver if the receiver of the wireless projection device adopts a touch monitor as the display device of wireless projection. Therefore, an additional USB connecting port is occupied.

SUMMARY

In view of the above, the present disclosure proposes a transmission device capable of control feedback and a control feedback method, thereby solving the problem that the conventional wireless projection technology has to occupy an additional connecting port (which means two port are occupied) or supports only a few operating systems.

According to one embodiment of the present disclosure, a transmission device capable of control feedback is adapted to electrically connect to an electronic device and a display device with an input circuit, wherein the electronic device is configured to output an image signal and perform an operation according to a control signal, and the transmission device capable of control feedback comprises: a sender and a receiver. The sender comprises a first transmission interface, a first processing circuit, and a first communication circuit. The receiver comprises a second transmission interface, a second processing circuit, and a second communication circuit. The first transmission interface is configured to electrically connect to the electronic device, wherein the first transmission interface comprises a Universal Serial Bus type-C port and has a first connecting port and a second connecting port. The first connecting port is configured to receive the image signal and the second connecting port is configured to send the control signal to the electronic device. The first processing circuit electrically connects to the first transmission interface and converts an internet packet into the control signal. The first communication circuit electrically connects to the first processing circuit, receives the internet packet, and send the image signal. The second transmission interface electrically connects to the display device. The second transmission interface has a third connecting port and a fourth connecting port. The third connecting port is configured to send the image signal to the display device. The fourth connecting port is configured to receive the control signal. The second processing circuit electrically connects to the second transmission interface and converts the control signal into the internet packet. The second communication circuit electrically connects to the second processing circuit, communicably connects to the first communication circuit, sends the internet packet, and receives the image signal.

According to one embodiment of the present disclosure, a transmission device capable of control feedback adapted to electrically connect to an electronic device and a display device, wherein the display device electrically connects to a Human Interface Device. The transmission device capable of control feedback comprises a sender and a receiver. The sender electrically connects to the electronic device. The sender receives an image signal outputted by the electronic device and sends a control signal to the electronic device. The sender comprises a first communication circuit and a first processing circuit. The first communication circuit communicably connects to the receiver. The first communication circuit receives a description information and an internet packet, and sends the image signal to the receiver. The first processing circuit electrically connects to the first communication circuit. The first processing circuit creates a virtual device according to the description information and converts the internet packet into the control signal by the virtual device. The receiver electrically connects to the display device. The receiver sends the image signal to the display device and receives the description information and a control signal outputted by the Human Interface Device. The receiver comprises a second processing circuit and a second communication circuit. The second processing circuit is configured to determine whether the display device comprises the Human Interface Device, obtain the description information of the Human Interface Device, and convert the control signal into the internet packet. The second communication circuit electrically connects to the second processing unit. The second communication circuit sends the description information and the internet packet and receives the image signal.

According to one embodiment of the present disclosure, a control feedback method adapted to a sender and a receiver communicably connecting to the sender, wherein the sender is configured to electrically connect to an electronic device to receive an image signal outputted by the electronic device, the receiver is configured to electrically connect to a display device to show the image signal, and the control feedback method comprises determining whether the display device electrically connects to a Human Interface Device by the receiver; obtaining a description information and sending the description information to the sender by the receiver, when a determination indicates that the display device electrically connects to the Human Interface Device; creating a virtual device according to the description information by the sender; detecting a control signal outputted by the Human Interface Device by the receiver after sending the description information to the sender by the receiver; converting the control signal into an internet packet and sends the internet packet to the sender; and converting the internet packet to the control signal and outputting the controller signal to the electronic device through the virtual device by the sender.

As described above, the image transmission device capable of control feedback and control feedback method may perform wireless projection without installing any software or driver, and thus support all operating systems. The present disclosure needs only one connecting port to achieve multimedia signal transmission and control feedback on user's device. Therefore, other connecting ports of user's electronic device may be preserved for other usage, and the wireless projection does not occupy too many connecting ports.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
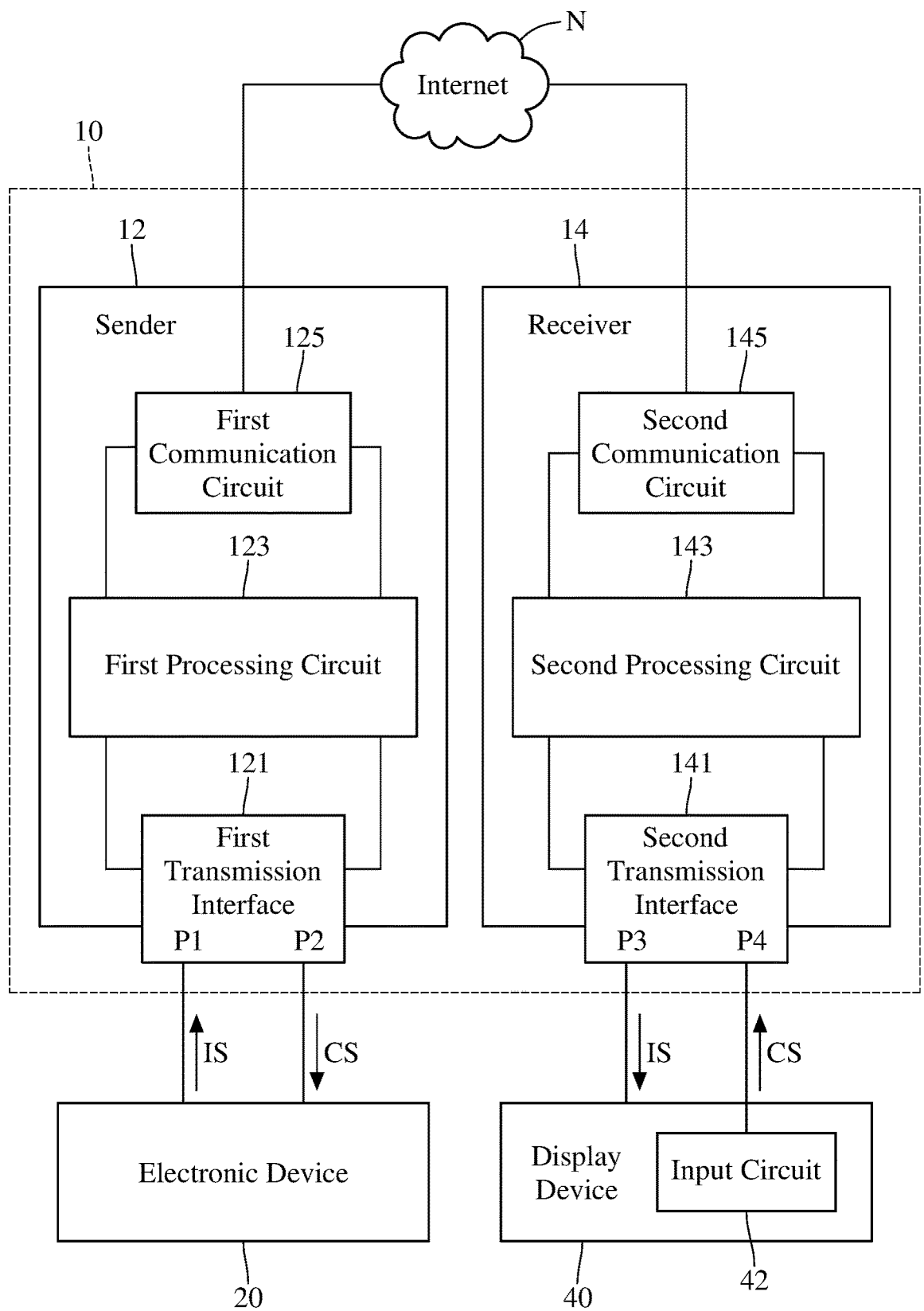
FIG. 1 is a block diagram of the transmission device capable of control feedback according to an embodiment of the present disclosure.

Please refer to FIG. 1, which illustrates a block diagram of a transmission device 10 capable of control feedback according to an embodiment of the present disclosure. As shown in FIG. 1, the transmission device 10 capable of control feedback is adapted to electrically connect to an electronic device 20 and a display device 40 with an input circuit 42.

The electronic device 20 is such as a personal computer, a laptop, a tablet computer, or a smartphone. The electronic device 20 may output an image signal IS. The electronic device 20 may also receive a control signal CS inputted from an external device and perform a corresponding operation accordingly.

The display device 40 may show the image signal IS. The input circuit 42 is such as a Human Interface Device (HID). The input circuit 42 may generate the control signal CS. In practice, the display device 40 with the input circuit 42 is such as a touch screen. However, the present disclosure does not limit the hardware type of the display device and the input circuit.

Please refer to FIG. 1. The transmission device 10 capable of control feedback comprises a sender 12 and a receiver 14. The sender 12 and the receiver 14 are communicably connected to each other through a network N. The network N is such as an internet with physical wire connection or a wireless network. The "network" mentioned in the following paragraphs adopts the "wireless network" as an example.

The sender 12 comprises a first transmission interface 121, a first processing circuit 123, and a first communication circuit 125. The first processing circuit electrically connects to the first transmission circuit 125.

The sender 12 electrically connects to the electronic device 20 through the first transmission interface 121, thereby receiving the image signal IS outputted by the electronic device 20 or sending the control signal CS to the electronic device 20. In practice, the sender 12 electrically connects to the electronic device 20 through a Universal Serial Bus (USB) type-C connector. USB type-C supports USB 2.0 and USB 3.0 specifications. Furthermore, USB type-C also supports DisplayPort Alternate Mode, so that the sender 12 and the electronic device 20 support DisplayPort Alternate Mode. Therefore, the multimedia data outputted by the electronic device 20 may be sent to the sender 12 through the Display Port of USB type-C, and also the control signal CS may be sent to the electronic device 20 through a transmission interface of conventional USB in USB type-C interface.

In an embodiment, the first processing circuit 123 may convert the internet packet (which will be described later) into the control signal CS. In another embodiment, the first processing circuit 124 may create a virtual device according to a description information (which will be described later) and convert the internet packet into the control signal CS by this virtual device. The description information is such as a report descriptor. The report descriptor comprises a content of data that will be transmitted, such as a transmission mode and format of the HID. Specifically, the sender 12 uses the Linux-USB Gadget framework to implement software functions of the device defined in USB specification. After the sender 12 receives the report descriptor, the sender 12 creates a virtual device with the same report descriptor under the framework. Therefore, after the electronic device 20 (such as the laptop) electrically connecting to the sender 12 recognizes this virtual device, the electronic device 20 may start to receive the control signal CS of HID class, and then perform corresponding operations.

In an embodiment, the first processing circuit 124 may convert the format of the image signal IS into a format of Real-time Transport Protocol (RTP). In another embodiment, the first communication circuit 125 may convert the format of the image signal IS into a self-defined format.

It should be noted that the first processing circuit 123 is not limited to process the image data, and may process the audio data. In further another embodiment, the first processing circuit 123 further comprises a codec. The codec encodes the original multimedia data from the electronic device 20 into a compressed multimedia data whose format is, for example, H.264, H.265, AAC, et cetera. The first processing circuit 124 further encrypts the compressed data so that the safety of the multimedia data can be ensured.

The first communication circuit 125 communicably connects to the receiver 14 to send the image signal IS to the receiver 14 and receive the description information and the internet packet from the receiver 14. In an embodiment, the first communication circuit 125 may send the image signal IS in User Datagram Protocol (UDP). In another embodiment, the first communication circuit 125 may send the image signal IS in Transmission Control Protocol (TCP). UDP is fast and efficient than TCP, so that the delay condition can be avoided. However, UDP lacks of a report mechanism for missing data, data missing may happen and affect image quality in practical condition. In a perspective of data transmission, using UDP is fast and efficient than using TCP, and the delay condition can be avoided effectively. On the other hand, transmission in TCP may ensure that data is transmitted to the receiver so that the image quality is not affected. In further another embodiment, the first communication 125 may select one of UDP and TCP transmission modes according to realistic condition.

Please refer to FIG. 1. The receiver 14 comprises the second transmission interface 141, the second processing circuit 143, and the second communication circuit 145. The second processing circuit 143 electrically connects to the second transmission interface 141 and the second communication circuit 145.

The receiver 14 electrically connects to the display device 40 through the second transmission interface 141, thereby sending the image signal IS to the display device 40 or receiving the description information and control signal CS outputted by the input circuit 42. In an embodiment, the second transmission interface 141 comprises the third connecting port P3 and the fourth connecting port P4. The third connecting port P3 may send the image signal IS to the display device 40. The fourth connecting port P4 may receive the description information and the control signal CS.

In an embodiment, the second processing circuit 143 converts the control signal CS into the internet packet. In another embodiment, the second processing circuit 143 performs an application which adopts "Polling" to determine whether the receiver 14 electrically connects to a HID. If the determination result is "yes", the second processing circuit 143 obtains the description information from the HID, and coverts the control signal CS sent from the HID into the internet packet. It should be noticed that HID described here is one of the implemented examples of the input circuit 42 electrically connecting to the display device 40.

The second communication circuit 145 communicably connects to the first communication circuit 125, thereby sending the description information and the internet packet to the sender 12 and receiving the image signal IS from the sender 12. The second communication circuit 145 may continue to send the internet packet after sending the description information. In an embodiment, it has to ensured that the control signal CS generated by the HID is transmitted to the sender 12 correctly to avoid a wrong operation. Therefore, the second processing circuit 143 converts the control signal CS into the internet packet with a self-defined format, and the second communication circuit 145 sends the converted internet packet in TCP.

In the architecture of FIG. 1, the image transmission device capable of control feedback may transmit the image signal from the electronic device 20 and the sender 12 to the receiver 14 and the display device 40, thereby achieving a control feedback effect. The control feedback method will be introduced in the following paragraphs.

Figure 2:
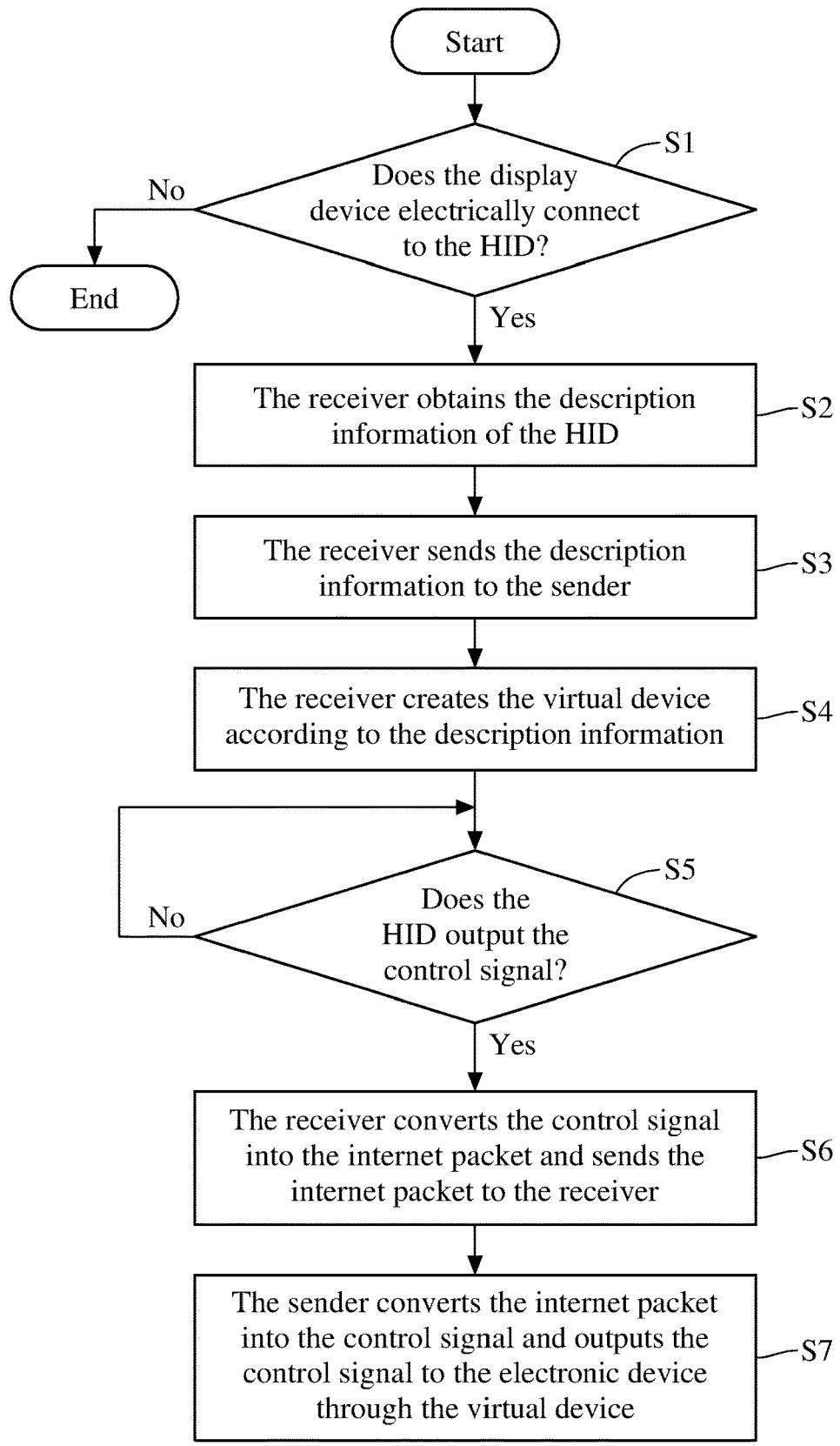
FIG. 2 is a flowchart of the control feedback method according to an embodiment of the present disclosures.

Please refer to FIG. 2, which illustrates the control feedback method according to an embodiment of the present disclosure, and the method is adapted to the sender 12 and the receiver 14 which electrically connects to the sender 12, wherein the sender 12 electrically connects to the electronic device 20 to receive the image signal IS outputted by the electronic device 20 and the receiver 14 electrically connects to the display device 40 to show the image signal IS. Please refer to step S1 in FIG. 2, determining whether the display device 40 electrically connects to a HID by the receiver 14. Step S1 is performed next if the determination result is "yes". The control feedback method according to an embodiment of the present disclosure finishes if the determination result is "no".

Please refer to step S2. The receiver 14 obtains the description information of the HID when the second processing circuit 143 determines that the display device 40 electrically connects to the HID. The second communication circuit 145 then sends the description information to the sender 12.

Please refer to step S4. The sender 12 creates the virtual device according to the description information. It is equivalent that the receiver 14 has already electrically connects to the USB-HID one the sender 12 receives the description information.

Please refer to step S5. After sending the description information to the sender 12, the receiver 14 detects whether the HID outputs the control signal CS. Step S6 is performed next if the detection result is "yes". Otherwise, step S5 continues to detect whether the HID outputs the control signal CS.

Please refer to step S6. If the HID outputs the control signal CS, the receiver 14 converts the control signal CS into the internet packet and sends the internet packet to the sender 12.

Please refer to step S7. The sender 12 converts the internet packet into the control signal CS and output this control signal CS to the electronic device 20 through the virtual device. The electronic device 20 performs a corresponding operation according to the control signal CS.

As described above, the present disclosure discloses an image transmission device capable of control feedback and control feedback method. The image transmission device capable of control feedback may perform wireless projection without installing any software or driver, and is not limited to the operating systems performed by the electronic device. The present disclosure may automatically detect whether the electrical connection is established. A virtual device is created only if the detection result is positive. Therefore, the present disclosure avoids to waste the system resource. In addition, the present disclosure need only one USB type-C port to transmit the multimedia data and send the control operation of the touch screen to the electronic device, so saving the number of occupied connecting ports. The present disclosure can enable the user located at the receiver of the wireless projection device to remotely control the electronic device located at the sender of the wireless projection device, so that the flexibility of the application of wireless projection is improved.

What is claimed is:

1. A transmission device capable of control feedback adapted to electrically connect to an electronic device and a display device with an input circuit, wherein the electronic device is configured to output an image signal and perform an operation according to a control signal, the display device is configured to show the image signal, the input circuit is configured to generate the control signal, the input circuit is a Human Interface Device, and the transmission device capable of control feedback comprises:
a sender independent of the electronic device comprising:
a first transmission interface configured to electrically connect to the electronic device, wherein the first transmission interface comprises a Universal Serial Bus type-C connector and has a first connecting port and a second connecting port, the first connecting port is configured to receive the image signal and the second connecting port is configured to send the control signal to the electronic device;

a first processing circuit electrically connecting to the first transmission interface and configured to convert an internet packet into the control signal; and a first communication circuit electrically connecting to the first processing circuit and configured to receive the internet packet and send the image signal; and a receiver comprising:

a second transmission interface configured to electrically connect to the display device, wherein the second transmission interface has a third connecting port and a fourth connecting port, the third connecting port is configured to send the image signal to the display device, and the fourth connecting port is configured to receive the control signal;

a second processing circuit electrically connecting to the second transmission interface and configured to convert the control signal into the internet packet; and a second communication circuit electrically connecting to the second processing circuit and communicably connecting to the first communication circuit and configured to send the internet packet and receive the image signal;

wherein the first processing circuit further converts a format of the image signal into a Real-time Transport Protocol format and sends the image signal of the Real-time Transport Protocol format to the receiver.

2. The transmission device capable of control feedback of claim 1, wherein the first processing circuit further comprises an encoder configured to compress the image signal, and the first processing is further configured to encrypt the compressed image signal.

3. The transmission device capable of control feedback of claim 1, wherein the first processing circuit further sends the image signal in a User Datagram Protocol; and the second communication circuit further sends the internet packet in a Transport Control Protocol.

4. A control feedback method adapted to a sender and a receiver communicably connecting to the sender, wherein the sender independent of an electronic device is configured to electrically connect to the electronic device through a Universal Serial Bus type-C connector to receive an image signal outputted by the electronic device, the receiver is configured to electrically connect to a display device to show the image signal, the display device comprises an input circuit configured to generate a control signal, the input circuit is a Human Interface Device, and the control feedback method comprises:

determining whether the display device electrically connects to the Human Interface Device by the receiver;

obtaining a description information and sending the description information to the sender by the receiver, when a determination indicates that the display device electrically connects to the Human Interface Device;

creating a virtual device according to the description information by the sender;

detecting the control signal outputted by the Human Interface Device by the receiver after sending the description information to the sender by the receiver;

converting the control signal into an internet packet and sends the internet packet to the sender;

converting the internet packet to the control signal and outputting the controller signal to the electronic device through the virtual device by the sender;

converting a format of the image signal into a Real-Time Transport Protocol format by the sender; and sending the image signal of the Real-Time Transport Protocol format to the receiver by the sender.

5. The control feedback method of claim 4, wherein sending the image signal of the Real-Time Transport Protocol format to the receiver by the sender comprising: and sending the image signal of the Real-Time Transport Protocol format in a User Datagram Protocol to the receiver by the sender.

6. The control feedback method of claim 4, wherein the description information is a report descriptor.

7. The control feedback method of claim 4, wherein the virtual device is created with Linux-USB Gadget framework by the sender.

* * * * *